United States Patent Office 3,374,235
Patented Mar. 19, 1968

3,374,235
S-TRIAZINES
Denis Varsanyi, Basel, and Willy Roth, Strengelbach, Aargau, Switzerland, assignors to Geigy Chemical Corporation, Greenburgh, N.Y., a corporation of Delaware
No Drawing. Filed Dec. 28, 1964, Ser. No. 421,693
Claims priority, application Switzerland, Dec. 31, 1963, 16,070/63
1 Claim. (Cl. 260—249.6)

The present invention concerns surface finishing agents which contain novel trisamino-s-triazine derivatives and the new compounds obtained by these processes.

By "surface finishing agents" in the present description are meant agents which can be used for the protection, e.g. coating, waxing and polishing of surfaces of all types.

We have found that of importance for the use in surface finishing agents according to the invention are trisamino-s-triazine derivatives of the general formula $$\begin{array}{c} R \\ | \\ N-Q-Y \\ R_1 \diagup N \diagdown N \diagdown R_3 \\ \diagdown N-\diagup N \diagdown-N \diagup \\ R_2 \quad\quad R_4 \end{array} \quad (I)$$

wherein R, $R_1$ and $R_3$ independently of each other represent hydrogen or optionally substituted aliphatic hydrocarbon radicals,
$R_2$ and $R_4$ represent optionally substituted aliphatic hydrocarbon radicals, but at least $R_4$ must be a lipophilic group which is selected from the group consisting of alkyl of from 10 to 18 carbon atoms and alkenyl of from 10 to 18 carbon atoms,
Q represents an alkylene or alkenylene radical, and
Y represents a hydrophilic substituent.

By optionally substituted aliphatic hydrocarbon radicals such as are represented by R, $R_1$ to $R_4$ in general Formula I are meant straight or branched chained alkyl or alkenyl radicals containing 1–20 carbon atoms, which radicals, for example, can be substituted by the hydroxyl ground and/or one or more halogen atoms such as, e.g. fluorine or chlorine.

By hydrophilic substituents represented by Y in the general Formula I are meant, in particular, ionogenic hydrophilic substituents, both acid as well as basic groups, and also non-dissociating hydrophilic groups, such as, e.g. the following: the carboxyl, sulfonic acid, carbamyl, sulfamyl, mono- or di-N-alkyl-sulfamyl, 1–18 alkoxycarbonyl, hydroxyalkoxy-carbonyl, N-alkyl-carbamyl, N-hydroxyalkyl-carbamyl, N-hydroxyalkyl, N-alkyl carbamyl, N,N-di(hydroxyalkyl)-carbamyl, the hydroxyl, an alkyl- and dialkyl-amino group, an amino-alkoxy-carbonyl or an alkanolamino or dialkanolamino group.

The alkylene or alkenylene radicals represented by Q in general Formula I preferably have straight chains and can contain 1–20 carbon atoms.

The compounds of general Formula I are obtained by reacting, in any order desired, 2,4,6-trichloro-s-triazine with amines of the general Formulas II, III and IV:

$$\begin{array}{ccc} R_1 & R_3 & R \\ \diagup & \diagup & \diagup \\ NH & NH & NH \\ \diagdown & \diagdown & \diagdown \\ R_2 & R_4 & Q-Y \\ (II) & (III) & (IV) \end{array}$$

wherein R, $R_1$, $R_2$, $R_3$, $R_4$, Q and Y have the meanings given above. The reactions can be performed in the presence of a solvent which is inert to the reaction partners, a proton acceptor and an inert gas.

Preferably the 2,4,6-trichloro-s-triazine (cyanuric chloride) is reacted first with an amine of the general Formula II or III at 0–5° C. (exothermic reaction), then with an amine of the general Formula III or II, respectively, at 40–60° C., and finally with an amine of the general Formula IV at 150–175° C. The third chlorine atom is preferably substituted in the presence of a higher boiling aliphatic hydrocarbon, for instance, a petroleum fraction boiling at 160–170° C, as solvent.

The solvents usual for reactions of cyanuric chloride and amines such as water, chloroform, mixtures of acetone and water, and mixtures of other organic solvents and water, are used as solvents for the first and second steps.

The trisamino-s-triazine derivatives of the general Formula I wherein Y is an acid hydrophilic substituent which forms anions, can be isolated in the form of their metal and ammonium salts, preferably in the form of their alkali metal salts.

The compounds wherein Y is a functional carboxylic acid derivative can be produced by a variation of the process described above by reacting, in the known manner, a compound of general formula $$\begin{array}{c} R \quad\quad O \\ | \quad\quad \diagup\!\!\diagdown \\ N-Q-C \\ \quad\quad\quad\quad\diagdown X \\ R_1 \diagup N \diagdown N \diagdown R_3 \\ \diagdown N-\diagup N \diagdown-N \diagup \\ R_2 \quad\quad R_4 \end{array} \quad (V)$$

wherein R, $R_1$, $R_2$, $R_3$, $R_4$ and Q have the meanings given above and X is a halogen atom, a lower alkoxy radical, the phenoxy radical or the hydroxyl group, with an alkanolamine, dialkanolamine, alkenylenediamine or alkane diol.

Preferred compounds due to their outstanding surface-finishing properties are those of the following five classes:
(I) Compounds which are of the formula $$\begin{array}{c} R \\ | \\ N \\ \diagup \diagdown Q-Y \\ R_1 \diagup N \diagdown N \diagdown R_3 \\ \diagdown N-\diagup N \diagdown-N \diagup \\ R_2 \quad\quad R_4 \end{array}$$

Wherein each of the R, $R_1$ and $R_3$ represents a member selected from the group consisting of hydrogen, alkyl of from 1 to 20 carbon atoms, cycloalkyl of from 6 to 12 ring carbon atoms, alkenyl of from 3 to 20 carbon atoms, hydroxy-alkyl of from 2 to 20 carbon atoms, fluoro-alkyl of from 3 to 20 carbon atoms, and chloro-alkyl of from 3 to 20 carbon atoms. $R_2$ represents a member selected from the group consisting of alkyl from 1 to 20 carbon atoms, cycloalkyl of from 6 to 12 ring carbon atoms, alkenyl of from 3 to 20 carbon atoms, hydroxy-alkyl of from 2 to 20 carbon atoms, fluoro-alkyl of from 3 to 20 carbon atoms, and chloro-alkyl of from 3 to 20 carbon atoms, $R_4$ represents a lipophilic radical, Q represents a member selected from the group consisting of alkylene of from 1 to 20 carbon atoms and alkenylene of from 3 to 20 carbon atoms, and $Y_1$ represents a member selected from the group consisting of —COOH and —SO$_3$H and which substitutes surpass those of the following classes in their capacity of imparting a firm gloss to surfaces of the type described to which they have been applied;

(II) Compounds which are of the same formula as those of Class I, but wherein $Y_1$ is replaced by $Y_2$ which latter represents a member selected from the group consisting of carbamyl, sulfamyl, mono- and di-alkyl-substituted carbamyl and sulfamyl wherein "alkyl" has from 1 to 16 carbon atoms, and N-hydroxy-alkyl-substituted carbamyl and sulfamyl wherein alkyl is of from 2 to 6 carbon atoms;

(III) Compounds which are of the same formula as those of Class I, but wherein $Y_1$ is replaced by $Y_3$ which latter represents a member selected from the group consisting of alkoxy carbonyl of from 2 to 18 carbon atoms, hydroxy-alkoxy carbonyl of from 2 to 18 carbon atoms and amino, mono-alkyl-amino- and di-alkyl-amino-alkoxy-carbonyl wherein "alkoxy" has from 2 to 6 carbon atoms.

(IV) Compounds which are of the same formula as those of Class I, but wherein $Y_1$ is replaced by $Y_4$ which latter represents a hydroxyl group, and Q is replaced by $Q_1$ which represents a member selected from the group consisting of alkylene of from 10 to 20 carbon atoms, and alkenylene of from 10 to 20 carbon atoms and wherein $Y_4$ is located at the $Q_1$ radical at least 4 carbon atoms remote from the two free bonds of Q.

(V) Compounds which are of the same formula as those of Class I, but wherein $Y_1$ is replaced by $Y_5$ which latter represents a member selected from the group consisting of mono- and di-lower alkyl-substituted amino, mono- and di-hydroxy-alkyl-substituted amino wherein alkyl has from 2 to 4 carbon atoms.

The trisamino-s-triazine derivatives of the general Formula I have wax-like properties; they are generally hard-waxes, of a hardness of about 1 to 5 as determined by the ASTM penetration method; they are resistant to chemicals, especially to alkalis and acids, and especially to household chemicals; they can be used instead of natural waxes or together therewith for the treatment and finishing of such surfaces as, for example, agents for the treatment of surfaces of inorganic materials, e.g. metal surfaces such as chromed metal parts, polished stone, ceramic tiles, but also as gloss-imparting and surface-protecting agents for automobile bodies of organic materials, e.g. wood, leather, plastic resinous material such as linoleum, etc., on textiles as hydrophilic agents and paper as carriers for copying layers. They have characteristic properties also possessed by natural waxes such as solubility in lipophilic solvents, are compatible with natural and synthetic waxes, can be converted readily to pastes and have good gelling properties, e.g. with organic solvents, particularly with low boiling petroleum fractions, and have a good solvent retaining power. Surfaces treated therewith can be given a high gloss upon light polishing.

The metal and ammonium salts, the addition salts of inorganic and organic acids and the quarternary ammonium salts of the compounds of general Formula I can have similar properties and instead of or together with natural waxes be used for the above-described purposes.

Surface finishing agents according to the invention are obtained by mixing a trisamino-s-triazine derivative of the general Formula I or several such derivatives with the usual substances which are suitable for the treatment of surfaces. Such substances are, for example, the following: natural and synthetic waxes, resins, silicones, etc. which improve the physical properties, also solvents, as well as inorganic and organic fillers, e.g. silicates, milled plastics, anionic, cationic or non-ionic dispersing agents, cleansing agents such as, e.g. natural and synthetic soaps, tensioactive substances, pigments, agents to improve the stability to light, stabilizers of all types such as corrosion inhibitors, scents, dyestuffs, biocidal active substances or agents containing such substances, e.g. insecticides, fungicides, bactericides, etc.

The content of compounds of Formula I in such agents ranges from 0.2 to about 50%, of the total weight of the agent.

The surface finishing agents according to the invention can be in the form of and used as aerosols, solvents, emulsions, semi-solid and solid pastes. The agents can thus serve to protect and to finish surfaces of all types, by which is also included the treatment of paper, e.g. the production of carbon paper.

The following examples describe the production of the trisamino-s-triazine derivatives and the production of the surface finishing agents according to the invention. Parts and percentages are given therein by weight and the temperatures are in degrees centigrade.

*Example 1*

370 parts of cyanuric chloride (technically pure) are dissolved by slightly heating in 3000 parts by volume of carbon tetrachloride in a sulphonating flask and the solution is then cooled to 0–3°. 1078 parts of n-octadecylamine (technically pure) in finely pulverised form are then added in portions within about 3 hours while stirring and cooling intensively. Cooling is necessary because the reaction is strongly exothermic. A solution of 220 parts of sodium carbonate (technically pure, dry), dissolved in 1000 parts by volume of distilled water is then added slowly dropwise within about 40 minutes while cooling well. The reaction mixture is brought to room temperature while stirring and then slowly brought to the boil whereupon it is refluxed for 4–5 hours. The resultant product is cooled to room temperature while stirring, and the solid part is filtered off under suction and washed three times on the filter with 300 parts by volume of carbon tetrachloride.

The filter residue is crushed and dried in about 24 hours in a vacuum dryer at 50–60°/14–200 torr. The reaction product is slurried twice with about 6000 parts by volume of warm distilled water and the water is removed. 2-chloro-4,6-bis-n-octadecylamino-s-triazine is obtained as a snow white powder. It melts at 139–140° and the yield is 86% of the theoretical.

42 parts of 11-amino-undecane carboxylic acid (technically pure) are then suspended in 500 parts by volume of "Special Petrol I" and the suspension is heated to 70–80°. 20 parts of sodium hydroxide (technically pure), freshly pulverised, are then added in small portions within 5–10 minutes while stirring intensively and the whole is stirred for another 1–1½ hours at a temperature of 70–80°. 130 parts of finely pulverised 2-chloro-4,6-bis-n-octadecylamino-s-triazine are then added in portions within about 30–40 minutes while stirring vigorously. The mixture is then stirred under reflux under an atmosphere of nitrogen, for 2 hours at a temperature of 90–100°, then for 2 hours at a temperature of 130–140° and finally for 18 hours at a temperature of 160–170°. The contents of the flask are then cooled to 100° while stirring and the solid part is filtered off on a steam filter upon which there is a 3–4 mm. thick layer of the Kieselguhr "Hyflo-Super-Cel" which has been slurried with a little gasoline. The residue is washed twice with 100 parts by volume of hot solvent each time. The solution obtained, which is barely opalescent, is evaporated to dryness in a rotary evaporator and the residue is dried in a vacuum dryer at 60–70° under about 14–20 mm. pressure. The sodium salt of 11-[2',4'-bis-n-octadecylamino-s-triazinyl-(6')]-amino-undecane carboxylic acid is obtained in a yield of about 98% of the theoretical as a pale yellowish product which melts at 188–190°.

*Example 2*

In a sulphonating flask, 95 parts of cyanuric chloride (technically pure) are dissolved by gently heating in 1500 parts by volume of carbon tetrachloride and the solution is then cooled to 0–3°. 135 parts of finely pulverised n-octadecylamine (technically pure) are then added in portions in about 30–40 minutes at 0–5° while intensively stirring and cooling. Good cooling is necessary as the reaction is strongly exothermic. A solution of 55 parts of sodium carbonate (technically pure, dry), dissolved in 200 parts by volume of distilled water is then added slowly dropwise within 30 minutes while cooling well. Here again, the reaction is exothermic so that good cooling is necessary. The whole reaction mixture is thereupon stirred for 3 hours at this temperature. After the cooling bath has been removed, 101 parts of 11-aminoundecane carboxylic acid (technically pure) are added in portions in about 30–40 minutes while stirring vigorously. The inner temperature during this addition is 10–15°. A solution of 27 parts of sodium carbonate (technically pure, dry), in 100 parts by volume of distilled water is then added dropwise at this temperature within about 15–20 minutes. The whole reaction mixture is then brought to the boil and refluxed for another 5 hours. It is then cooled to room temperature while stirring and mixed, in the flask, with 1500 parts by volume of acetone. It is filtered under suction, the crude product is dried in a vacuum dryer at 50–60° under 14–20 torr pressure and the organic solvent is removed. The reaction product is then stirred twice with about 5000 parts by volume of warm distilled water and filtered off under suction. The reaction product is dried in a vacuum dryer at 50–60° under 14–20 torr pressure. 11-[2'-chloro-4'-n-octadecylamino - s - triazinyl-(6')]-amino-undecane carboxylic acid, in the form of the sodium salt, is obtained as a snow white powder. The yield is about 95% of the theoretical and it melts at 138–140° C.

60.4 parts of 11-[2'-chloro-4'-n-octadecylamino-s-triazinyl-(6')]-amino undecane carboxylic acid sodium salt and 52.2 parts of di-n-octadecylamine are dissolved at 70–80° in 500 parts by volume of gasoline, and 5 parts of finely pulverized sodium hydroxide are added to this solution. The temperature of the reaction mixture is brought to 160–170° within about 4 hours while introducing nitrogen and the reaction mixture is stirred for about 18 hours at this temperature. After cooling to 100°, the reaction mixture is filtered hot with the aid of "Hyflo-Super-Cel" and then the solvent is distilled off from the filtrate. As residue, the pure sodium salt of 11-[2'-n-octadecylamino-4'-di-n-octadecylamino-s-triazinyl - (6')]-amino-undecane carboxylic acid is obtained in a yield of about 98% of the theoretical. It melts at 98–100°.

Compounds falling under Formula I in which R, —Q—Y, $R_1$, $R_2$, $R_3$ and $R_4$ are the groups given in the following table, are obtained by the procedure of Examples 1 and 2, respectively, but using correspondingly substituted starting materials in equivalent amounts in view of the materials used in the said examples.

TABLE

| Ex. No. | R | —Q—Y | $R_1$ | $R_2$ | $R_3$ | $R_4$ |
|---|---|---|---|---|---|---|
| 3 | H | $-C_{10}H_{20}COONa$ | H | $n-C_{18}H_{37}$ | H | $n-C_{18}H_{37}$ |
| 4 | H | $-C_{10}H_{20}COONa$ | H | $n-C_{18}H_{37}$ | $n-C_{18}H_{37}$ | $n-C_{18}H_{37}$ |
| 5 | $CH_3$ | $C_5H_{10}COOH$ | $C_3H_7$ | $C_3H_7$ | $CH_3$ | $C_{12}H_{25}$ |
| 6 | Allyl | Oleyl COOH | $CH_3$ | $CH_3$ | $C_3H_7$ | $C_{16}H_{33}$ |
| 7 | β-Hydroxy-ethyl | $C_{10}H_{20}COONa$ | H | $C_6H_{13}$ | H | $C_{15}H_{31}$ |
| 8 | $CF_3-(CH_2)_2-$ | $C_8H_{16}COONa$ | H | $C_8H_{17}$ | H | $n-C_{18}H_{37}$ |
| 9 | $CH_2Cl$ $\overset{|}{C}H_2-CH_2$ $\overset{|}{C}H_2-$ | $C_5H_{10}COOH$ | $C_2H_5$ | $C_2H_5$ | H | $C_{16}H_{33}$ |
| 10 | H | Oleyl-COONa | Allyl | $CH_3$ | Allyl | $C_{18}H_{37}$ |
| 11 | H | $C_{10}H_{20}SO_3H$ | H | Allyl | H | $C_{15}H_{31}$ |
| 12 | H | $C_{12}H_{24}SO_3H$ | $HO-CH_2-CH_2-$ | $HO-CH_2CH_2-$ | H | Oleyl |
| 13 | $C_2H_5$ | $C_{10}H_{20}SO_3H$ | $C_2H_5$ | $C_2H_5$ | $HO-\overset{|}{C}H_2$ $\overset{|}{C}H_2-$ | $C_{12}H_{25}$ |
| 14 | H | $C_5H_{10}COOK$ | $Cl-CH_2-CH_2-CH_2-$ | $Cl-CH_2-CH_2$ $\overset{|}{C}H_2-$ | $CH_3$ | $C_{18}H_{37}$ |
| 15 | H | $CH_2-SO_3H$ | H | ⟨H⟩ | H | ⟨H⟩ |
| 16 | H | $C_5H_{10}COOH$ | $C_2H_5$ | $C_2H_5$ | H | Tricyclododecyl |
| 17 | H | $-C_{10}H_{20}COONa$ | H | $n-C_3H_7$ | H | $n-C_{18}H_{37}$ |
| 18 | H | $-C_{10}H_{20}COOH$ | H | $n-C_4H_9$ | H | $n-C_{18}H_{37}$ |
| 19 | H | $-C_{10}H_{20}COONa$ | H | $n-C_4H_9$ | H | $n-C_{18}H_{37}$ |
| 20 | H | $-C_{10}H_{20}COOK$ | H | $n-C_4H_9$ | H | $n-C_{18}H_{37}$ |
| 21 | H | $-C_5H_{10}COOH$ | H | $n-C_6H_{13}$ | H | $n-C_{18}H_{37}$ |
| 22 | H | $-C_5H_{10}COOK$ | H | $n-C_6H_{13}$ | H | $n-C_{18}H_{37}$ |
| 23 | H | $-C_{10}H_{20}COOH$ | H | $n-C_{12}H_{25}$ | H | $n-C_{18}H_{37}$ |
| 24 | H | $-C_{10}H_{20}COONa$ | H | $n-C_{12}H_{25}$ | H | $n-C_{18}H_{37}$ |
| 25 | H | $-C_{10}H_{20}COOH$ | $C_{12}H_{25}$ | $n-C_{12}H_{25}$ | H | $n-C_{18}H_{37}$ |
| 26 | H | $-C_{10}H_{20}COONa$ | $C_{12}H_{25}$ | $n-C_{12}H_{25}$ | H | $n-C_{18}H_{37}$ |
| 27 | H | $-C_{10}H_{20}COOH$ | $C_{12}H_{25}$ | $n-C_{12}H_{25}$ | $n-C_{12}H_{25}$ | $n-C_{12}H_{25}$ |
| 28 | H | $-C_{10}H_{20}COONa$ | $C_{12}H_{25}$ | $n-C_{12}H_{25}$ | $n-C_{12}H_{25}$ | $n-C_{12}H_{25}$ |
| 29 | H | $-C_{10}H_{20}COOH$ | H | $n-C_{16}H_{33}$ | H | $n-C_{18}H_{37}$ |
| 30 | H | $-C_{10}H_{20}COONa$ | H | $n-C_{16}H_{33}$ | H | $n-C_{18}H_{37}$ |
| 31 | H | $-CH_2COOH$ | H | $n-C_{18}H_{37}$ | H | $n-C_{18}H_{37}$ |
| 32 | H | $-CH_2COONa$ | H | $n-C_{18}H_{37}$ | H | $n-C_{18}H_{37}$ |

TABLE—Continued

| Ex. No. | R | -Q-Y | R₁ | R₂ | R₃ | R₄ |
|---|---|---|---|---|---|---|
| 33 | H | $-C_5H_{10}COOH$ | H | $n-C_{18}H_{37}$ | H | $n-C_{18}H_{37}$ |
| 34 | H | $-C_5H_{10}COONa$ | H | $n-C_{18}H_{37}$ | H | $n-C_{18}H_{37}$ |
| 35 | H | $-C_{10}H_{20}COOK$ | H | $n-C_{18}H_{37}$ | H | $n-C_{18}H_{37}$ |
| 36 | H | $-C_{10}H_{20}COOCaOH$ | H | $n-C_{18}H_{37}$ | H | $n-C_{18}H_{37}$ |
| 37 | (H)₂ | $(-C_{10}H_{20}COO)_2AlCl$ | (H)₂ | $(n-C_{18}H_{37})_2$ | (H)₂ | $(n-C_{18}H_{37})_2$ |
| 38 | H | $-C_{10}H_{20}COOCH_2$<br>$\quad\quad NH_2-CH_2$<br>$\quad\quad \cdot HCl$ | H | $n-C_{18}H_{37}$ | H | $n-C_{18}H_{37}$ |
| 39 | H | $-C_{10}H_{20}COOCH_2-\overset{NH_2}{\underset{CH_3}{C}}-CH_3$<br>$\cdot HCl$ | H | $n-C_{18}H_{37}$ | H | $n-C_{18}H_{37}$ |
| 40 | H | $-C_{10}H_{20}COOH$ | $CH_3$ | $n-C_{18}H_{37}$ | $CH_3$ | $n-C_{18}H_{37}$ |
| 41 | H | $-C_{10}H_{20}COONa$ | $CH_3$ | $n-C_{18}H_{37}$ | $CH_3$ | $n-C_{18}H_{37}$ |
| 42 | H | $-C_{10}H_{20}COOH$ | $n-C_{18}H_{37}$ | $n-C_{18}H_{37}$ | H | $n-C_{18}H_{37}$ |
| 43 | H | $-C_{10}H_{20}COOH$ | H | $n-C_{18}H_{35}$ | H | $n-C_{18}H_{37}$ |
| 44 | H | $-C_{10}H_{20}COONa$ | H | $n-C_{18}H_{35}$ | H | $n-C_{18}H_{37}$ |
| 45 | H | $-C_{10}H_{20}COOH$ | H | $n-C_{18}H_{35}$ | H | $n-C_{18}H_{35}$ |
| 46 | H | $-C_{10}H_{20}COONa$ | H | $n-C_{18}H_{35}$ | H | $n-C_{18}H_{35}$ |
| 47 | H | $-C_{10}H_{20}COOH$ | H | $n-C_6H_{13}$ | H | $n-C_{18}H_{37}$ |
| 48 | H | $-C_{10}H_{20}COONa$ | H | $n-C_6H_{13}$ | H | $n-C_{18}H_{37}$ |
| 49 | H | $-C_{10}H_{20}COOH$ | H | $n-C_{18}H_{37}$ | H | $n-C_{18}H_{37}$ |
| 50 | H | $-C_{10}H_{20}COONa$ | $n-C_{18}H_{37}$ | $n-C_{18}H_{37}$ | $n-C_{18}H_{37}$ | $n-C_{18}H_{37}$ |
| 51 | H | $-C_{10}H_{20}COOH$ | H | $n-C_{18}H_{36}OH$ | H | $n-C_{18}H_{36}OH$ |
| 52 | H | $-C_{10}H_{20}COOH$ | H | $n-C_{18}H_{35}(OH)_2$ | H | $n-C_{18}H_{35}(OH_2)$ |
| 53 | H | $-C_{10}H_{20}COONa$ | H | $n-C_{18}H_{35}(ONa)_2$ | H | $n-C_{18}H_{35}(ONa)_2$ |
| 54 | H | $-C_{10}H_{20}COOC_2H_5$ | H | $n-C_{18}H_{37}$ | H | $n-C_{18}H_{37}$ |
| 55 | H | $-C_{10}H_{20}COOK$ | H | $n-C_{18}H_{35}$ | H | $n-C_{18}H_{37}$ |
| 56 | H | $-C_{10}H_{20}COOC_{18}H_{37}$ | H | $n-C_{18}H_{37}$ | H | $n-C_{18}H_{37}$ |
| 57 | H | $-C_5H_{10}COONa$ | H | $n-C_{12}H_{25}$ | H | $n-C_{18}H_{37}$ |
| 58 | H | $-C_5H_{10}COOH$ | H | $n-C_{12}H_{25}$ | H | $n-C_{18}H_{37}$ |
| 59 | H | $-C_2H_4-SO_3H$ | H | $n-C_{18}H_{37}$ | H | $n-C_{18}H_{37}$ |
| 60 | H | $-C_{10}H_{20}CONH_2$ | H | $n-C_{18}H_{37}$ | H | $n-C_{18}H_{37}$ |
| 61 | H | $-C_{10}H_{20}SO_2NH_2$ | H | $C_{18}H_{37}$ | $C_{18}H_{37}$ | $n-C_{18}H_{37}$ |
| 62 | $CH_3$ | $-C_5H_{10}CO-NH$<br>$\quad\quad\quad\quad CH_3$ | $C_3H_7$ | $C_3H_7$ | $CH_3$ | $C_{12}H_{25}$ |
| 63 | $CH_3$ | $CO-C_{12}H_{24}-$<br>$\quad\quad N(C_2H_5)_2$ | $CH_3$ | $CH_3$ | $C_3H_7$ | $C_{16}H_{33}$ |
| 64 | $HO-CH_2-CH_2-$ | $SO_2-C_{10}H_{20}-$<br>$\quad\quad N(C_2H_4OH)_2$ | H | $C_6H_{13}$ | H | $C_{15}H_{31}$ |
| 65 | $CF_3-C_2H_4-$ | $SO_2-C_8H_{16}-$<br>$\quad\quad NHCH_3$ | H | $C_{18}H_{37}$ | H | $C_{16}H_{37}$ |
| 66 | $CH_2Cl$<br>$\quad\|\quad$<br>$(CH_2)_3-$ | $SO_2-C_5H_{10}-$<br>$\quad\quad N(CH_3)_2$ | $C_2H_5$ | $C_2H_5$ | H | $C_{16}H_{33}$ |
| 67 | H | $-C_{10}H_{20}CON\overset{CH_3}{\underset{C_2H_4OH}{}}$ | H | $CH_3$ | H | $C_{18}H_{37}$ |
| 68 | H | Oleyl-$SO_2N(C_3H_7)_2$ | allyl | $CH_3$ | allyl | $C_{18}H_{37}$ |
| 69 | H | $SO_2-C_{10}H_{20}-$<br>$\quad\quad N(CH_3)_2$ | H | allyl | H | $C_{15}H_{31}$ |
| 70 | H | $-C_{12}H_{24}SO_2NH_2$ | $HOC_2H_4-$ | $HOC_2H_4-$ | H | Oleyl |
| 71 | $C_2H_5$ | $SO_2-C_{10}H_{24}-$<br>$\quad\quad N(C_4H_9)_2$ | $C_2H_5$ | $C_2H_5$ | $HOC_2H_4-$ | $C_{12}H_{25}$ |

TABLE—Continued

| Ex. No. | R | -Q-Y | $R_1$ | $R_2$ | $R_3$ | $R_4$ |
|---|---|---|---|---|---|---|
| 72 | H | $-C_{10}H_{24}CONH_2$ | $CH_2Cl$<br>\|<br>$CH_2-CH_2-$ | $CH_2Cl$<br>\|<br>$CH_2CH_2-$ | $CH_3$ | $-C_{18}H_{37}$ |
| 73 | H | $SO_2-C_2H_4-$<br>\|<br>$N(C_{16}H_{33})_2$ | H | ⬡H | H | ⬡H |
| 74 | H | $SO_2-C_5H_{10}-$<br>\|<br>$N(C_5H_{11})_2$ | $C_2H_5$ | $C_2H_5$ | H | Tricyclo-decanoyl |
| 75 | $CH_2Cl$<br>\|<br>$(CH_2)_3-$ | $-C_5H_{10}COOC_5H_{11}$ | $C_2H_5$ | $C_2H_5$ | H | $C_{18}H_{37}$ |
| 76 | H | $-C_{10}H_{20}CO-OC_2H_4OH$ | allyl | $-CH_3$ | allyl | $C_{18}H_{37}$ |
| 77 | H | $-C_{10}H_{20}CO-OC_3H_6NH_2$ | H | allyl | H | $C_{15}H_{31}$ |
| 78 | H | $C_2H_4O-CO-C_{12}H_{24}-$<br>\|<br>$N(CH_3)_2$ | $HO-C_2H_4-$ | $HO-C_2H_4-$ | H | oleyl |
| 79 | $C_2H_5$ | $C_2H_4O-CO-C_{10}H_{20}-$<br>\|<br>$NHCH_3$ | $C_2H_5$ | $C_2H_5$ | $HO(CH_2)_3-$ | $C_{12}H_{25}$ |
| 80 | H | $CO-oleyl$<br>\|<br>$OC_{12}H_{25}$ | $Cl(CH_2)_3-$ | $Cl(CH_2)_3-$ | $CH_3$ | $C_{15}H_{31}$ |
| 81 | H | $-CH_2-CO-OC_{18}H_{37}$ | H | ⬡H | H | ⬡H |
| 82 | H | $CO-C_5H_{10}-$<br>\|<br>$OC_4H_9NH_2$ | $C_2H_5$ | $C_2H_5$ | H | Tricyclo-decanoyl |
| 83 | $CH_3$ | $-C_{10}H_{20}-CO-OCH_3$ | $C_3H_7$ | $C_3H_7$ | $CH_3$ | $C_{12}H_{25}$ |
| 84 | allyl | $-Oleyl-COOCH_3$ | $CH_3$ | $CH_3$ | $CH_3$ | $C_{18}H_{37}$ |
| 85 | $HOC_2H_4-$ | $-C_{10}H_{20}CO-OC_3H_7$ | H | $C_2H_5$ | H | $C_{15}H_{31}$ |
| 86 | $CF_3-CH_2-CH_2-CH_2-$ | $-C_{10}H_{20}CO-OC_2H_5$ | H | $C_3H_7$ | H | $C_{18}H_{37}$ |
| 87 | $ClCH_2-CH_2-CH_2-CH_2-$ | $-C_2H_4-CO-OC_2H_5$ | $C_2H_5$ | $C_2H_5$ | H | $C_{16}H_{33}$ |
| 88 | H | $-C_{10}H_{20}-CO-OCH_3$ | H | $C_{18}H_{37}$ | H | $C_{18}H_{37}$ |
| 89 | H | $-C_4H_8-CHOH-C_5H_{11}$ | H | $CH_3$ | H | $C_{18}H_{37}$ |
| 90 | H | $-C_5H_{10}-CHOH-C_6H_{13}$ | H | $C_{18}H_{37}$ | $C_{18}H_{37}$ | $C_{18}H_{37}$ |
| 91 | $CH_3$ | $-C_7H_{14}-CHOH-C_8H_{17}$ | $C_3H_7$ | $CH_3$ | $C_3H_7$ | $C_{16}H_{33}$ |
| 92 | $HO-CH_2-CH_2-$ | $-C_8H_{16}-CHOH-C_9H_{19}$ | H | $CH_3$ | H | $C_{15}H_{31}$ |
| 93 | $Cl-CH_2-CH_2-CH_2-$ | $-C_8H_{16}-CHOH-C_9H_{19}$ | $C_2H_5$ | $C_2H_5$ | H | $C_{18}H_{37}$ |
| 94 | H | $-C_7H_{14}-CHOH-C_8H_{17}$ | $HO-CH_2-CH_2-$ | H | H | Oleyl |
| 95 | $C_2H_5$ | $-C_8H_{16}-CHOH-C_9H_{19}$ | H | $HO-CH_2-CH_2-$ | $C_2H_5$ | $C_{12}H_{25}$ |
| 96 | $C_4H_9$ | $-C_4H_8-CHOH-C_5H_{11}$ | $C_2H_5$ | $C_2H_5$ | $HO-CH_2-CH_2-CH_2-$ | $C_{18}H_{37}$ |
| 97 | $CH_3$ | $-C_8H_{16}-CHOH-C_9H_{19}$ | $Cl-(CH_2)_3-$ | $Cl-(CH_2)_3-$ | $CH_3$ | $C_{18}H_{37}$ |
| 98 | H | $-C_8H_{16}-CHOH-C_4H_9$ | H | ⬡H | H | ⬡H |
| 99 | $CH_3$ | $-C_8H_{16}-CHOH-C_9H_{19}$ | $C_2H_5$ | $C_2H_5$ | H | Tricyclo-decanoyl |
| 100 | H | $-(CH_2)_5NHC_2H_5$ | H | $n-C_{18}H_{37}$ | H | $n-C_{18}H_{37}$ |
| 101 | H | $-(CH_2)_5N(CH_3)_2$ | $C_3H_7$ | $C_3H_7$ | $n-C_{18}H_{37}$ | $n-C_{18}H_{37}$ |
| 102 | $CH_3$ | $-(CH_2)_{10}-N(C_2H_5)_2$ | $C_3H_7$ | $CH_3$ | $C_3H_7$ | $C_{16}H_{33}$ |
| 103 | H | $oleylene-N(CH_3)_2$ | $CH_3$ | $C_6H_{13}$ | H | $C_{15}H_{31}$ |
| 104 | $C_2H_5$ | $-(CH_2)_4NHCH_3$ | H | $C_8H_{17}$ | H | $n-C_{18}H_{37}$ |
| 105 | H | $-(CH_2)_5N(C_2H_4OH)_2$ | H | $C_2H_5$ | H | $C_{16}H_{33}$ |
| 106 | H | $-(CH_2)_5NHC_3H_7$ | $C_2H_5$ | Allyl | H | $C_{15}H_{31}$ |
| 107 | $CH_3$ | $-(CH_2)_{10}N(CH_3)_2$ | Allyl | $CH_3$ | Allyl | $C_{18}H_{37}$ |
| 108 | H | $-(CH_2)_5-N\begin{smallmatrix}C_2H_4OH\\C_2H_5\end{smallmatrix}$ | H | $HOCH_2CH_2-$ | H | Oleyl |

TABLE—Continued

| Ex. No. | R | -Q-Y | R₁ | R₂ | R₃ | R₄ |
|---|---|---|---|---|---|---|
| 109 | $C_3H_7$ | $-(CH_2)_5-N\begin{smallmatrix}C_3H_6OH\\H\end{smallmatrix}$ | $HOCH_2-CH_2-$ | $C_2H_5$ | $HOCH_2CH_2$ | $C_{12}H_{25}$ |
| 110 | H | $-(CH_2)_{12}-N(CH_3)_2$ | $C_2H_5$ | $Cl-CH_2CH_2-$ | $CH_3$ | $n-C_{18}H_{37}$ |
| 111 | H | $-(CH_2)_{12}-N(C_3H_7)_2$ | $Cl-CH_2-CH_2-$ | H | H | $n-C_{12}H_{25}$ |
| 112 | H | $-(CH_2)_6N(C_4H_8OH)_2$ | H | $C_2H_5$ | $C_2H_5$ | Tricyclo-decanoyl |

*Example 113.—(liquid floor wax)*

5.25 parts of the sodium salt of 11-[2′,4′-bis-n-octadecyl-amino-s-triazinyl-(6′)]-amino-undecyclic acid,
0.75 parts of vinyloctadecyl ether polymerisate (M.P. 49° C.),
1.50 parts of microcrystalline petroleum wax (M.P. 74–76° C.; penetration ASTM 30),
7.50 parts of paraffin (M.P. 50–52° C.),
5.00 parts of 1,4-dioxan,
80.00 parts of petroleum fraction (boiling range 150–180° C.).

The components are mixed with each other by heating at 120° C. and the resulting clear solution is quickly cooled while stirring, whereupon a homogeneous gel-like liquid is formed. This is used as liquid floor wax on wood or linoleum floors to give a very good gloss.

*Example 114.—(aerosol floor wax)*

3.15 parts of the sodium salt of 6-[2′,4′-bis-n-octadecyl-amino-s-triazinyl-(6′)-amino]-caproic acid,
0.45 parts of polyvinyl stearate (M.P. 46–48° C.),
0.90 parts of micro crystalline petroleum wax (M.P. 74–76° C.; penetration ASTM 30),
4.50 parts of paraffin (M.P. 50–52° C.),
3.00 parts of diethylene glycol monoethyl ether,
48.00 parts of petroleum fraction (boiling range 180–220° C.),
40.00 parts of dichlorodifluoromethane.

The components which are solid or liquid at normal temperature are mixed with each other with heating at 120° C. and the resulting solution is quickly cooled while stirring. The mixture formed is placed in a pressure container fitted with a spray valve and propellant gas is added. The mixture formed, which can be sprayed, is excellently suitable as floor wax. It gives a good gloss on wooden floors and has excellent shelf-life.

*Example 115.—(furniture polish)*

1.25 parts of 11-[2′,4′-bis-n-didodecylamino-s-triazinyl-(6′)]-amino-undecyclic acid,
5.00 parts of dimethylpolysiloxane (viscosity 300 cps./20° C.),
1.25 parts of sorbitan monolaurate,
1.25 parts of polyoxyethylene sorbitan monolaurate,
43.75 parts of petroleum fraction (boiling range 180–220° C.),
47.50 parts of water.

The organic components are mixed with each other by heating at 100° C. and the boiling water is added to this hot solution while stirring vigorously. The mixture is cooled while stirring whereupon a homogenous, white liquid is formed which is excellently suitable for the care of furniture.

*Example 116.—(water-repellant aerosol for use on textiles)*

5.00 parts of 11-[2′-n-octadecylamino-4′-di-n-octadecyl-amino-s-triazinyl-(6′)]-amino-undecylic acid,
15.00 parts of perchloroethylene,
40.00 parts of trichlorofluoromethane,
40.00 parts of dichlorodifluoromethane.

11 - [2′-n-octadecylamino-4′-di-n-octadecylamino-s-triazinyl-(6′)]-amino-undecyclic acid is dissolved in the perchloroethylene. This solution is placed in a pressure container fitted with a spray valve and the propellant gases (trichlorofluoromethane and dichlorodifluoromethane) are added. The sprayable mixture formed is excellently suitable for attaining a water repellent effect on textiles such as cotton, particularly when the invisible coating formed is ironed.

*Example 117.—(car polish)*

1.00 part of oxidized micro crystalline petroleum wax (M.P. 82° C.), penetration ASTM: 7; saponification number 75/85,
2.00 parts of 11-[2′,4′-bis-didodecylamino-s-triazinyl-(6′)]-amino-undecylic acid,
2.00 parts of dimethylpolysiloxane (viscosity: 500 cps./20° C.),
1.00 part of sorbitan monolaurate,
1.00 part of polyoxyethylene sorbitanmonolaurate,
35.00 parts of petroleum fraction (boiling range 180–220° C.),
38.00 parts of water,
4.00 parts of propane,
16.00 parts of butane.

The organic components which are solid and liquid at normal temperature are dissolved at 100° C. and the boiling water is added to this hot solution while stirring vigorously. The mixture is cooled while stirring and then placed in a pressure container fitted with a spray valve and the propellant gases (propane and butane) are added. The sprayable mixture so formed is excellently suitable for application on exterior surfaces of automobile body parts and other lacquered metal surface. The mixture is rubbed on lightly and thereby imparts to such surfaces a high gloss.

*Example 118.—(carbon paper)*

42.00 parts of 11-[2′-n-octadecylamino-4′-octadecene-(8″)-yl-amino-triazinyl-(6′)]-amino-undecylic acid,
5.00 parts of petroleum jelly,
26.00 parts of spindle oil,
5.00 parts of anhydrous lanolin,
1.2 parts of the base of Victoria Blue B,
0.6 part of methyl violet,
2.2 parts of olein,
6.00 parts of milori blue,
12.00 parts of carbon black.

Carbon black, milori blue and spindle oil are finely milled in a color triple roll mill. The remaining components are added to this mixture and the whole is heated to 120° C. while stirring until a homogeneous preparation is formed. A thin layer of this mixture is evenly applied by means of a heatable calender to one side of a carbon-supporting paper. Thereby, carbon paper is obtained which is suitable for the production of copies.

*Example 119.*—(*emulsion wax*)

(a) 3.19 parts of 11-[2′,4′-bis-n-octadecylamino-s-triazinyl-(6′)]-amino-undecylic acid,
3.19 parts of paraffin (M.P. 50–52° C.),
6.38 parts of montanic acid ester wax, (M.P. 80–83° C., acid No. 20/30, saponification No. 135/150),
1.70 parts of olein,
1.36 parts of aminomethyl propanol,
1.53 parts of cetyl alcohol polyglycol ether with 4 to 5 ethyleneoxy groups, as emulsifying agent,
67.66 parts of water;
(b) 2.25 parts of alkali-soluble solid phenol/formaldehyde resin, dissolved in a mixture of
0.67 part of aqueous concentrated ammonia (25%), and
12.07 parts of water.

The components of mixture (a), with the exception of the water, are melted at 150° and stirred until a homogeneous melt is obtained. The melt is cooled to 100–110°, the water is brought to the boil and is then added thereto, and the resulting mixture (a) is cooled to room temperature. This mixture (a) is obtained in the form of an emulsion to which the solution (b) is added. The resultant emulsion is excellently suitable for the care of modern floors, such as "vinyl" flooring.

We claim:
1. A compound of the formula

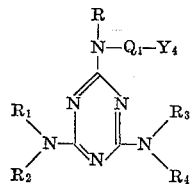

wherein each of R, $R_1$ and $R_3$ represents a member selected from the group consisting of hydrogen, alkyl, of from 1 to 20 carbon atoms, cycloalkyl of from 6 to 12 ring carbon atoms, alkenyl of from 3 to 20 carbon atoms, hydroxy-alkyl of from 2 to 20 carbon atoms, fluoro-alkyl of from 3 to 20 carbon atoms, and chloro-alkyl of from 3 to 20 carbon atoms, $R_2$ represents a member selected from the group consisting of alkyl of from 1 to 20 carbon atoms, cycloalkyl of from 6 to 12 ring carbon atoms, alkenyl of from 3 to 20 carbon atoms, hydroxy-alkyl of from 2 to 20 carbon atoms, fluoro-alkyl of from 3 to 20 carbon atoms, and chloro-alkyl of from 3 to 20 carbon atoms, $R_4$ represents a lipophilic radical selected from the group consisting of alkyl from 10 to 18 carbon atoms and alkenyl of from 10 to 18 carbon atoms, $Y_4$ represents hydroxyl, and $Q_1$ represents a divalent radical selected from the group consisting of alkylene of from 10 to 20 carbon atoms and alkylene of from 10 to 20 carbon atoms, and wherein $Y_4$ is located at the $Q_1$ radical at least 4 carbon atoms remote from each of the two free bonds of $Q_1$.

References Cited
UNITED STATES PATENTS

| | | | |
|---|---|---|---|
| 2,909,421 | 10/1959 | Gysin et al. | 260—249 |
| 3,143,548 | 8/1964 | Vail et al. | 260—249 |
| 3,244,713 | 4/1966 | Dowbenko et al. | 260—249 |
| 3,265,690 | 8/1966 | Matter et al. | 260—249 |

NORMA S. MILESTONE, *Acting Primary Examiner.*

WALTER A. MODANCE, *Examiner.*

J. M. FORD, *Assistant Examiner.*